Oct. 23, 1945.  F. G. JULYAN  2,387,399
BIN FEED MECHANISM
Filed Feb. 15, 1944
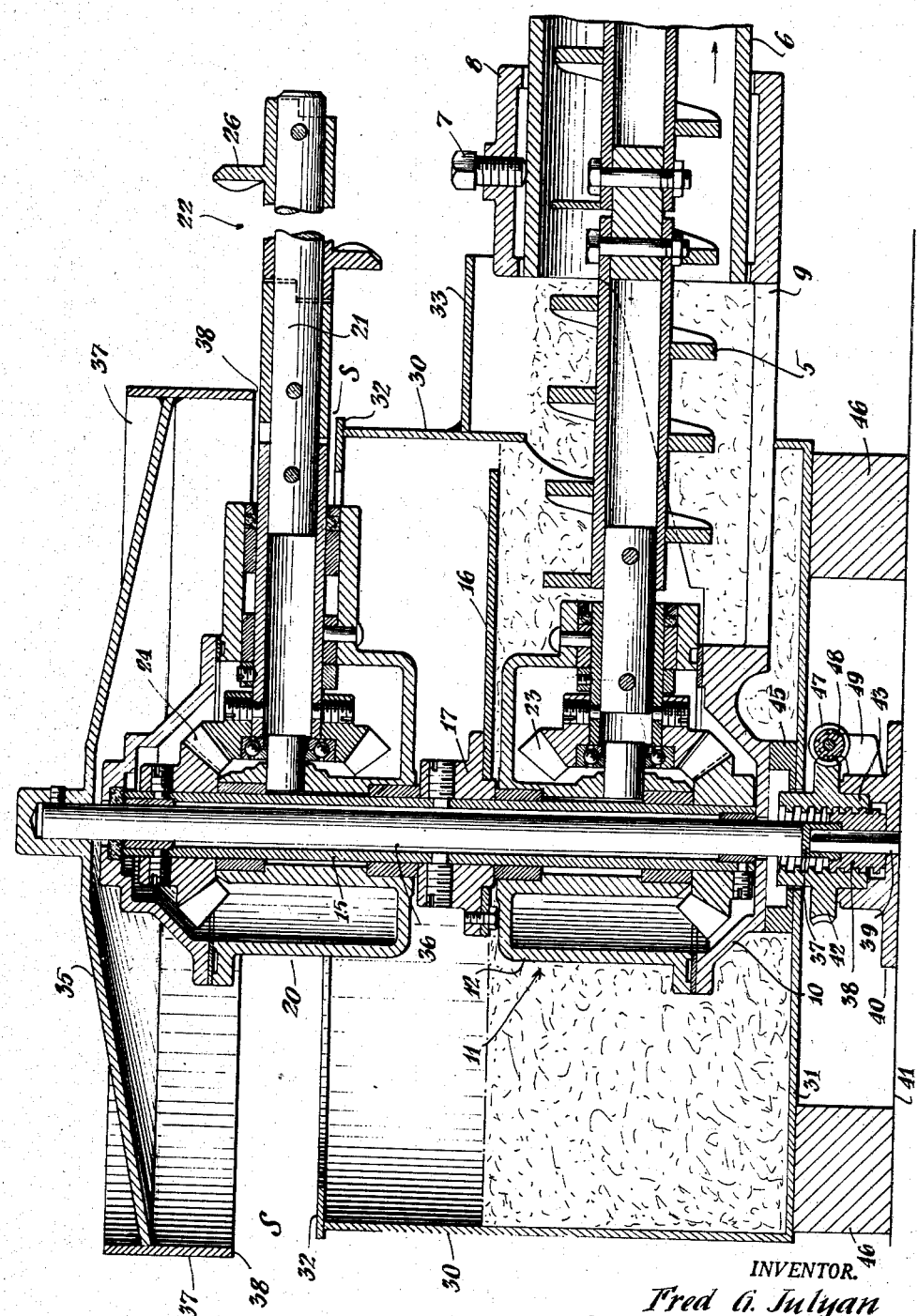
INVENTOR.
Fred G. Julyan
BY Frank A. Bower
ATTORNEY Patented Oct. 23, 1945

2,387,399

UNITED STATES PATENT OFFICE 2,387,399

BIN FEED MECHANISM

Fred G. Julyan, Euclid, Ohio, assignor to Pocahontas Fuel Company Incorporated, New York, N. Y., a corporation of Virginia Application February 15, 1944, Serial No. 522,492

6 Claims. (Cl. 198—44)

This invention relates to the supply of coal or the like from a pile or bin and particularly to a system for the withdrawal of the coal by a rotary outrigger arm carrying flights or vanes for moving the coal inward toward a central collector as in Schweickart and Julyan Patent No. 2,233,085 of February 25, 1941, for Conveying apparatus.

The object of the invention is to provide a control for the accumulation and movement of the material at the collector to regulate and stabilize the feed.

In the accompanying drawing illustrating the collector mechanism in vertical sectional view, coal or the like, and particularly small sized coal such as pea or slack, is supplied to the feed screw 5 and fed out by it through the tube 6, the end of which is gripped by set screw 7 in holder 8 at the outer end of bracket arm 9, the hub 10 of which forms part of the housing designated generally as 11 and having the upper housing 12 rigidly fastened to the lower portion 10 at the flanged union as shown.

A vertical rotary tube 15 is journaled in the housing section 12 and carries the blade or paddle 16 fixed to the tube by hub 17 upon which rests the upper housing 20 rotatable on tube 15 and carrying the outrigger arm 21 with its screw collector 22. Feed screw 5 is driven from the right and through gears 23 in housing 11 and gears 24 in housing 20 rotates the outrigger arm 21 around a horizontal axis and also tends to turn the entire housing 20 and arm 21 around a vertical axis as described in said Patent No. 2,233,085, the entire mechanism being intended to be submerged in the coal in a bin or the like. The number of spaced blades or flights 26 forming the screw conveyor of the outrigger arm engage the coal and feed it inward to within reach of the inner end of the screw conveyor 5 which then reverses the feed and carries the coal out into the feed tube 6.

To regulate the supply of coal to the feed worm 5 a well or barrier 30 is provided preferably of generally cylindrical form coaxial with the center of rotation and having the bottom plate 31 and the upper rim or shelf 32 around the top of the well and at a level just under the outrigger arm 21. This well structure confines the feed of material to the opening within the shelf 32, the guard 33 extending in arched form over the screw 5 to protect the screw from inflow from outside of the well.

Above the well 30 the hood or hat 35 is provided mounted on central shaft 36 in tube 15 and having the steel band 37 around its outer edge. The lower edge 38 of this steel band is preferably of larger diameter than the well 30 and overhangs as shown to leave an annular space S within which the outrigger arm 21 moves and rotates to feed in the coal. The dimension of this annular space S is critical in that it determines the rate of feed to the collector and therefore to the feed screw 5. For a well diameter of about fifteen inches the space S at 1.75" vertical opening gave a feed rate of about eight pounds per hour and at 3.0" vertical opening the rate was substantially doubled.

To vary the space S the shaft 36 carrying the hood 35 may be extended down through the casing 10 and adjustably supported, for instance on a cap piece 37 of a nut member 38 slidingly fitted on the square stud 39 fixed in position in base 40 resting on the bin floor 41 and rotatably supporting the worm wheel 42 in the hub 43 of which the member 38 is threaded. A sealing and supporting ring 45 intervenes between the housing 11 and the bottom plate 31 of the well, which plate rests in turn on beams 46 on the bin floor 41. A worm 47 meshing with the teeth of worm wheel 42 has its shaft 48 supported in bracket 49 of base 40 and this shaft 48 may be extended in any desired manner for operation outside of the bin, as for instance by flexible coupling means. Preferably such outside operating means will be calibrated with the rates of feed corresponding to the adjusted position of the hood 35. The adjustment mechanism described is merely typical and any desired system may be used, such for instance as a cable, cam wedge or rack.

The parts of the well and hood are inexpensively and durably constructed of welded parts and in combination with the feed screws and the stirring paddle provide a reliable source of supply for the coal feed which may be set at any desired rate of feed within its range and will maintain said rate irrespective of the amount of coal in the bin. The system is proof against avalanching of the coal into the pick up worm 5 and the rate of supply to the worm may be adjusted to different heating systems or to correspond to varying demands of a given heating system or to seasonal changes.

When first installed the well is filled to the level of the blade 16 and in operation the coal feeds into the well in metered amount through the space S, the supply being maintained by the outrigger screw 22. This screw and the feed screw 5 are of sufficient capacity at a given speed to furnish the maximum desired amount of material at full opening of the space S. Restriction of this space reduces the flow of material to the well 30 and feed screw 5 and correspondingly adjusts the supply so that without the necessity of changing the screw speeds or otherwise modifying the mechanism a wide range of the feed rate is attained in very simple manner, the entire supply for the feed worm 5 passing through the control space S.

I claim:

1. Bin feed mechanism comprising an outrigger feed screw swinging around a vertical axis and rotatable around a horizontal axis to draw material in toward said vertical axis, a well at the inner end of said feed screw extending up into proximity to said feed screw and having a bottom forming a storage space, screw means submerged in the material in said storage space and adapted to withdraw material at a predetermined maximum rate from said storage space, and means above the outrigger feed screw for limiting the rate of feed of material into said well comprising a member cooperating with the edge of said well to form a restricted opening into said storage space and limit the rate of supply of material to said well to less than the said maximum rate of withdrawal so that the rate of feed of material by said mechanism as a whole is determined by said member above said outrigger feed screw limiting the rate of feed of material into said well.

2. Bin feed mechanism as set forth in claim 1 in which the relative positioning of the edge of the well and the cooperating member is adjustable to control the rate of feed of material into said well.

3. Bin feed mechanism as set forth in claim 1 in which the cooperating member is a hood above the well.

4. Bin feed mechanism as set forth in claim 1 in which the cooperating member is a hood above the well and having a diameter greater than the diameter of the well.

5. Bin feed mechanism as set forth in claim 1 in which the feed screw means of the upper outrigger are discontinued beyond the periphery of the well and the cooperating member and the well are adapted to be positioned close to the shaft of said outrigger feed screw to form a correspondingly restricted opening between them.

6. Bin feed mechanism comprising a lower feed screw, an upper outrigger feed screw swinging around a vertical axis and rotatable around a horizontal axis to draw material in toward the inner end of said lower feed screw, a well around said vertical axis and below said outrigger screw and containing said inner end of said lower feed screw, and a hood above said outrigger feed screw and spaced from the upper portion of said well to leave an annular space for the mainly horizontal feed of material by said outrigger screw into said well while intervening against vertical movement of material into said well, said hood having a shaft movable to different vertical positions and with supporting means variable at a distance from the shaft to adjust the shaft vertically and correspondingly vary the annular space between the well and the hood.

FRED G. JULYAN.